United States Patent [19]

Brown et al.

[11] Patent Number: 4,860,284

[45] Date of Patent: Aug. 22, 1989

[54] METHOD AND APPARATUS FOR IDENTIFYING LOCATION OF A LOST TOKEN SIGNAL IN A DATA COMMUNICATION NETWORK

[75] Inventors: David B. Brown, Columbus; Richard E. Wallace, Newark, both of Ohio

[73] Assignee: American Telephone and Telegraph Company, AT&T Bell Laboratories, Murray Hill, N.J.

[21] Appl. No.: 183,959

[22] Filed: Apr. 20, 1988

[51] Int. Cl.[4] ............................................... H04J 3/14
[52] U.S. Cl. ......................................... 370/88; 370/86
[58] Field of Search ..................... 370/86, 88, 89, 85, 370/13, 16

[56] References Cited

U.S. PATENT DOCUMENTS 4,404,557  9/1983  Grow ..................................... 370/86
4,805,168  2/1989  Kato ...................................... 370/89
4,805,170  2/1989  Fergeson et al. ..................... 370/89

Primary Examiner—Douglas W. Olms
Assistant Examiner—Min Jung
Attorney, Agent, or Firm—Dwight A. Marshall

[57] ABSTRACT

Apparatus and method for identifying the location of a lost token signal continuously transmitted on transmission paths interconnecting nodes of a network to sequentially enable the nodes to write data onto the network. The arrival of the token signal at each node is recorded in counter states of a token track counter corresponding with the node. The recorded binary counter states are compared upon the failure of the token signal to arrive at a node to detect mismatches and transitions occurring between adjacent nodes counter states identifying the network location of the lost token signal.

34 Claims, 9 Drawing Sheets

PROCESSOR AND RING CONTROL

| ADDRESS | MEMORY | |
|---|---|---|
| | TOKEN TRACK COUNTER BINARY STATES | |
| NODE 2 | 0 | 1 |
| NODE 3 | 1 | 0 |
| NODE 4 | 0 | 1 |
| NODE 5 | 0 | 1 |
| NODE 6 | 0 | 1 |
| NODE 7 | 0 | 1 |

METHOD AND APPARATUS FOR IDENTIFYING LOCATION OF A LOST TOKEN SIGNAL IN A DATA COMMUNICATION NETWORK

TECHNICAL FIELD

The invention relates to data communication networks using a token signal to enable access thereto.

BACKGROUND AND PROBLEM

Data Systems use data communication networks to exchange data. Typically, a data communication network, hereinafter called network, has transmission paths interconnecting nodes each coupled to data systems and each arranged to write data generated by an originating data system onto the network transmission paths and to read data received on the network transmission paths and addressed to a destination data system off the network.

These networks oftentimes use a token signal which is continuously transmitted on the network transmission paths to sequentially arrive at each node. In order to control the traffic flow on the network and to prevent one node from continuously transmitting data on the network thereby denying other nodes access, each node is inhibited from writing data onto the network until the node receives the token signal. When a node receives the token signal, the node is thereby enabled to write data onto the network exclusive of all other nodes. A problem arises in these networks in that the token signal is sometimes inadvertently lost. This may occur because of transient or equipment failures either in the nodes or transmission paths, or both, and results in an operational failure in that data systems are unable to write data onto the network thereby rendering the network inoperative until such time as the network location wherein the token signal was lost is identified.

SOLUTION

The foregoing problem is solved and networks having nodes interconnected by transmission paths wherein a token signal transmitted on the transmission paths sequentially enables each node to write data onto a network is substantially enhanced by a network method and apparatus having counter states for recording an arrival of the token signal at each node and for comparing the counter states of adjacent nodes to detect mismatches and transitions identifying a network location of a loss of the token signal.

The illustrative network comprises apparatus having binary counter states corresponding with each node for detecting an arrival of the token signal at the node and for recording the node detection of the token signal arrival in the binary counter states. A predetermined interval of time is initiated upon the detection of the token signal arrival at each node, and upon an expiration of the time interval indicating a loss of the token signal in the network, the apparatus registers a current status of the binary counter states. The registered status of the binary counter states are compared to identify a network location wherein the token signal was lost from mismatches occurring in ones of adjacent node registered binary counter states. The network is reconfigured to isolate the identified network location of the lost token signal and another token signal is written onto one of transmission paths of the reconfigured network to restore operation of the network.

BRIEF DESCRIPTION OF THE DRAWING

FIG. 5 sets forth an illustrative section of a processor memory provided for use in the network nodes and ring control processor set forth in FIG. 1.

DETAILED DESCRIPTION

Figure 1:
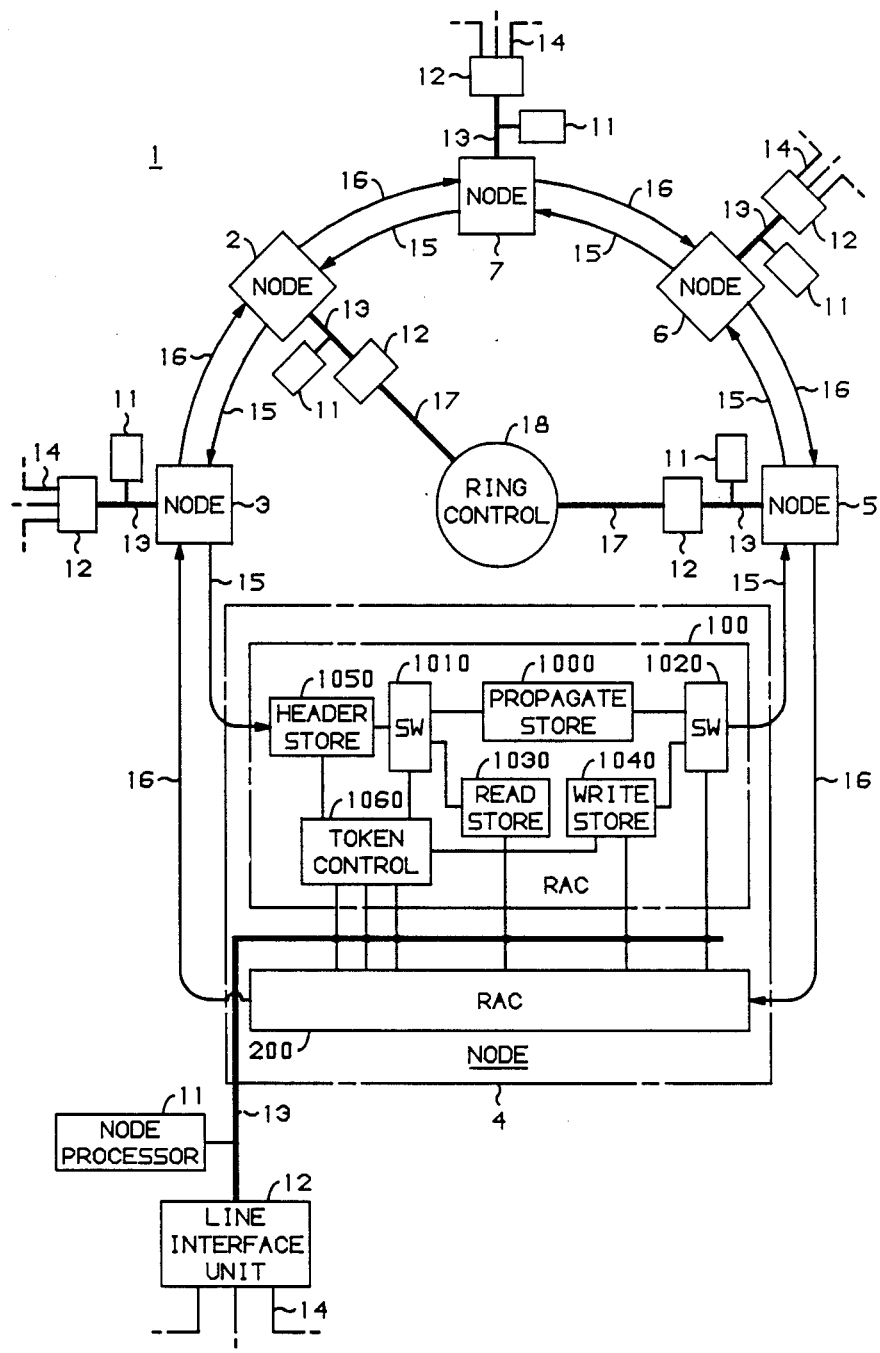
FIG. 1 is a block diagram of a network embodying the principals of the invention.

Network 1, FIG. 1, may be a type of network as disclosed by M. L. Blood et al. in U.S. Patent No. 4,554,659 issued on Nov. 19, 1985, and by D. M. Rouse et al. in U.S. Patent No. 4,683,563 issued on July 28, 1987. Network 1 has a number of nodes 2 through 7 interconnected by transmission paths 15 and 16 to form an illustrative network 1 wherein nodes 3, 4, 6 and 7 couple data systems to network 1 in order that data may be selectively exchanged between data systems. A node 3, 4, 6 and 7 may be connected by a data bus 13 with a node processor 11 and line interface unit 12 for terminating data links 14 coupling data systems with network 1. Node 2 and 5 may interconnect ring control 18 with network 1 by data bus 17 to a node interface unit 12.

In operation, a data system transmits data over data link 14, through line interface unit 12 and data but 13 to a node processor 11. Node processor 11 formats the received data into a data message similar to the message format disclosed by the aforementioned U.S. Patents 4,544,659 and 4,683,563. The data message is subsequently transmitted over data bus 13 to an originating node and written onto a directional transmission path 15, 16 and transmitted to a destination node. The destination node reads the data message off a transmission path 15, 16 onto data bus 13 into node processor 11. Data of the received data message is transmitted via data bus 13, through line interface unit 12 and over data link 14, to a receiving data system. Network 1 may transmit the data message over transmission paths 15, 16 through one node, data buses 17, ring control 18 and another node to a different network sector wherein is located a destination node.

Figure 2:
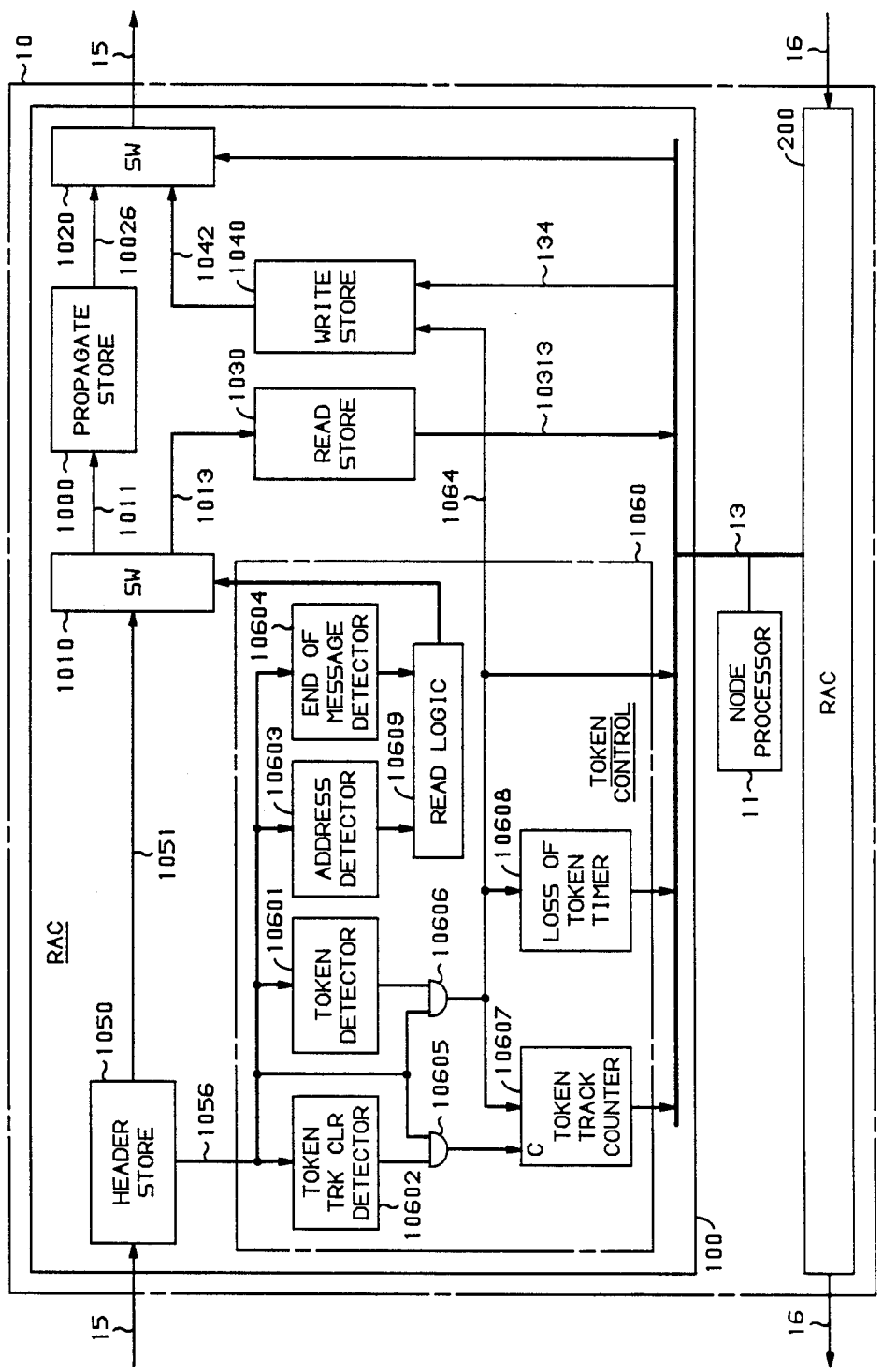
FIG. 2 illustrates the functional apparatus relationship of a node of the network set forth in FIG. 1.

The present embodiment of the invention assumes that each node is identical in performance and structure to other nodes and only node 10, FIG. 2, typical of nodes 2 through 7, need be described for an understanding of the invention. It is further assumed that each node, FIG. 1, may have a pair of ring access controls 100, 200, one of which corresponds with transmission path 15 and the other with transmission path 16. Each node ring access control 100, 200 is identical in performance and structure to the other and each, FIG. 2, is coupled by data bus 13 to node processor 11. An incoming transmission path, such as transmission path 15, is connected to header store 1050 which is connected to switch 1010 and token control 1060. One output of switch 1010 is coupled to read store 1030 which is coupled via data bus 13 to node processor 11. Switch 1010 is also connected to propagate store 1000 which is connected by switch 1020 to outgoing transmission path 15. Each node ring access control 100, 200 has a write store 1040, 2040 connected by data bus 13 with node processor 11 and to switch 1020, 2020 in order that data messages may be selectively written onto outgoing transmission paths 15 and 16.

Each node ring access control 100, 200 has a token control 1060, FIG. 2, provided with an address detector 10603 and an end-of-message detector 10604 coupled with read logic 10609 arranged to control operation of switch 1010. Token control 1060 also has a token detector 10601 and token track clear detector 10602 coupled respectively to inputs of logic gates 10606, 10605. Logic gate 10606 is coupled via lead 1064 to write store 1040, data bus 13, loss-of-token timer 10608 and along with logic gate 10605 to token track counter 10607. The outputs of token track counter 10607 and loss-of-token timer 10608 are coupled with node processor 11 and write store 1040 via data bus 13.

A node receiving a data message on transmission path 15 stores the address portion in header store 1050. Address detector 10603 examines the address stored in header store 1050, and if the data message is addressed to this node, it enables read logic 10609 to control switch 1010 to connect lead 1051 with read store 1030 via lead 1013. The incoming data message is transmitted from header store 1050 through switch 1010 to read store 1030. When the end of the incoming data message is detected by end-of-message detector 10604, read logic 10609 is controlled to operate switch 1010 to switch transmission path 1051 to transmission path 1011. Subsequently, the stored data message is transmitted from read store 1030 over data buses 10313 and 13 to node processor 11. Node processor 11 processes the received data for use in controlling the operation of node 10 or formulates data that is transmitted via data bus 13 and line interface unit 12, FIG. 1, over a data link 14 to a destination data system. If address detector 10603, FIG. 2, determines from the address portion stored in header store 1050 that the incoming data message is addressed to another node, read logic 10609 remains in a normal state whereby switch 1010 continues to connect transmission path 1051 with transmission path 1011. The incoming data message is transmitted from header store 1050 through switch 1010 to propagate store 1000. Subsequently, the data message is transmitted from propagate store 1000 over transmission path 10026 and through switch 1020 onto outgoing transmission path 15.

During an initialization sequence prior to writing a token signal onto the transmission paths 15, 16, ring control 18, FIG. 1, transmits initialization data via data bus 17, line interface unit 12 and data bus 13 to a node processor 11. Node processor 11 formats an initialization data message and transmits the formatted initialization data message over data bus 13 to write store 1040. In addition, node processor 11 activates switch 1020 to connect write store 1040 with outgoing transmission path 15 so that write store 1040 may force write the initialization data message onto transmission path 15. The data initialization message is subsequently transmitted on transmission path 15 to sequentially reach each node of network 1. Header store 1050, FIG. 2, of each node detects the incoming initialization data message and enables an input of logic gate 10605 and token track clear detector 10602 to clear token track counter 10607. Token track counter 10607 is a counting device capable of assuming counter states in response to an input received from logic gate 10606. It may be a memory device having a pair or a number of binary counter states wherein is recorded a count of the output signals generated by logic gate 10606.

Upon initialization of network 1, ring control 18, if provided, or a node having token control, writes a token signal onto a transmission path 15, 16. Ring control 18, or a token control node, subsequently records the identity of the node that first wrote the token signal onto network 1. The token signal is continuously transmitted on transmission paths 15 and 16 to sequentially enable each node having data to write a data message onto network 1 for transmission to a destination node. The token signal received on incoming transmission path is stored in header store 1050. Token detector 10601 detects the presence of the received token signal in header store 1050 and enables an input of logic gate 10606. Receipt of the token signal in header store 1050 enables the other input of logic gate 10606 to advance the count of token track counter 10607. Operation of logic gate 10606 also initializes loss of token timer 10608 to start the beginning of a predetermined interval of time the length of which is greater than the period of time that it takes the token signal to travel around transmission paths 15, 16 of network 1 when network 1 is handling a maximum amount of data message traffic.

Logic gate 10606 also enables node token control 1060 to place signals on lead 1064 and data bus 13 to inform write store 1040 and node processor 11 of the token signal arrival. If node 10 has a data message to write onto network 1, node processor 11 enables switch 1020 to connect write store 1040 to outgoing transmission path 15 so that write store 1040 may write the stored data message onto network 1. After write store 1040 has finished writing the data message onto outgoing transmission path 15, node processor 11 operates switch 1020 to disconnect write store 1040 and reconnect propagate store 1000 to outgoing transmission path 15. The stored token signal previously transmitted from header store 1050 through switch 1010 to propagate store 1000 is then transmitted through switch 1020 onto outgoing transmission path 15. If there are no data messages stored at node 10, the token signal is transmitted from header store 1050 through switch 1010, propagate store 1000 and switch 1020 onto outgoing transmission path 15.

The token signal, FIG. 1, continuously transmitted around network 1, sequentially enables each node 2 through 7 having data to write data messages onto network 1. Token detector 10601, FIG. 2, enables token track counter 10607 of each node to record the token signal arrival at the node and initializes loss of token timer 10608 to start the predetermined interval of time. Since node 2, FIG. 1, initially wrote the token signal onto network 1, token track counter 10607, FIG. 2 of node 2, records a zero in the binary counter states thereof. As the token signal continues its journey around transmission path 15, token track counters 10607 of nodes 3 through 7 are successively set to record a one in one of the binary counter states thereof. When the token signal arrives back at node 2, token track counter 10607 of node 2 is advanced to record a one. As the token signal continues around network 1 on transmission path 15, token track counters 10607 of the network nodes 3 through 7 are advanced from one to zero and each node loss of token timer 10608 is initialized to state the beginning of the predetermined interval of time.

If the token signal is lost in network 1, FIG. 1, for example between nodes 3 and 4 on transmission path 15, node 4 loss of token timer 10608 times out at the expiration of the predetermined interval of time and notifies node processor 11 over data bus 13 that the token signal failed to reach node 4. Node processor 11, FIG. 2, registers the current status of the binary counter states by reading the contents of node 4 token track counter 10607 over the data bus 13 into memory. Assuming that token track counters 10607 of network nodes 2 and 3 had been set to one and zero, respectively, node 4, having not received the lost token signal, would continue to store a one in token track counter 10607. Node 4 processor 11, receiving the expiration of the predetermined interval of time as an indication of the loss of the token signal and registering the current status of one recorded in token track counter 10607, formulates a token signal lost data message for transmitting to ring control 18.

The token signal lost data message includes information that the predetermined time interval of node loss of token timer 10608 expired and that one is the current status of the node token track counter 10607. Node processor 11 addresses the token signal lost data message to ring control 18 and then transmits the formatted data message over data bus 13 to write store 1040. Switch 1020 is operated by node processor 11 to connect write store 1040 with outgoing transmission path 15 so that the formatted token signal lost data message may be force written from node 4 write store 1040 onto network 1. Although the present embodiment of the invention assumes that the formatted token signal lost data message is force written onto outgoing transmission path 15, it is to be understood that node processor 11 could have, FIG. 4, force written the formatted data message onto outgoing transmission path 16 via write store 2040 and switch 2020. The node 4 token signal lost data message appearing on outgoing transmission path 15, FIG. 1, is received by node 5 and read off network 1 into read store 1030 thereof and transmitted over data bus 13 to node processor 11. Node processor 11 then transmits the received token signal lost data message through line interface unit 12 and over data bus 17 to ring control 18.

Sequentially, loss of token timer 10608, for each node 5 through 7 and 2 expires upon failure to receive the token signal and each node transmits a token signal lost data message containing the one recorded in the node token track counter 10607 over a transmission path and data bus 17 in the aforementioned manner to ring control 18. Node 3, having last received the token signal, transmits a token signal lost data message containing a zero recorded in node 3 token track counter 10607 to ring control 18 over transmission path 16 to node 2, line interface unit 12 and data bus 17.

Figure 3:
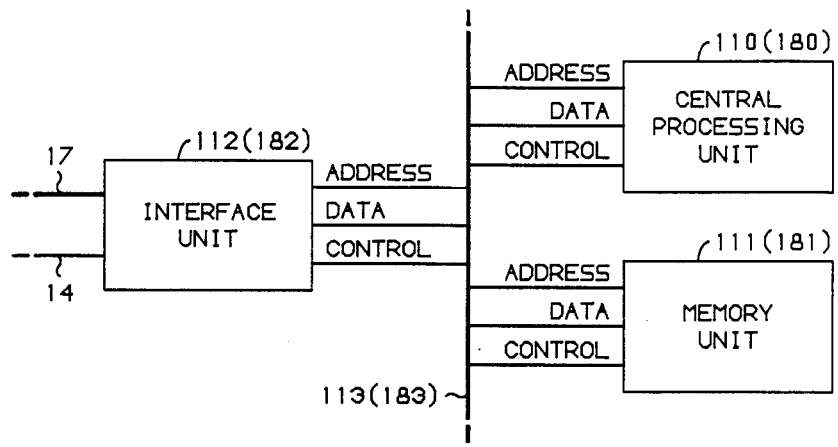
FIG. 3 illustrates the functional apparatus relationship of a node and ring control processor set forth in FIG. 1.

Ring control 18, FIG. 3, comprises a processor that may be a computer such as an AT&T 3B15 or 3B20 simplex or duplex computer. Such computers need not be described in detail for an understanding of the invention and in general have a central processing unit 180, memory unit 181 and interface unit 182 each connected by address, data and control leads to a central bus 183. Node processors 11 are similar in construction to ring control 18 but may be microprocessors such as a Motorola 68000 series or later design of microprocessor each having a central processing unit 110, memory unit 111 and interface unit 112 connected by address, data and control leads to a central bus 113.

Each incoming node token signal lost data message is received by interface unit 182 and processed by central processing unit 180 such that the status of the binary counter states of the node token track counter 10607 of each node, 2 through 7, is registered in ring control memory unit 181. Assuming that the token signal was lost between nodes 3 and 4, ring control memory unit 181 would register each node token track counter binary counter states as set forth in FIG. 5. For example, node 2, having originally written the lost token signal onto network 1, may have recorded binary counter states of zero, one or 01, depending on the number of counter states, as the status of node 2 token track counter 10607. Node 3 assuming two counter states and having last received the lost token signal would have recorded the node 3 token track counter 10607 binary counter states of 10. Remaining network nodes 4 through 7 each would have recorded node token track counter 10607 binary counter states of 01.

Ring control central processing unit 180, FIG. 3, compares the received and registered token track counter binary counter states of adjacent nodes to detect mismatches and transitions occurring between ones of the registered node binary counter states. All possible permutations of node binary counter states will show that for a loss of the token signal in the network there will be either two transitions or none. When there are two transitions, one transition will be associated with the node having first written the token signal onto the network and the other transition will be associated with the network location wherein the fault is located. If there are no transitions, then the network location of the fault is associated with the token signal writing node. Thus, node 2, FIG. 5, is compared with adjacent node 7 and 3 and the transition occurring between node 2 and node 3 is logged as a possible location of the lost token signal. Node 3 is compared with adjacent nodes 2 and 4 and the mismatches and transitions occurring between nodes 2 and 3 and between nodes 3 and 4 are logged as possible locations within network 1 wherein the token signal was lost. Ring control central processing unit 180 identifies network node 2 as having written the lost token signal onto network 1 and thereby eliminates the identity of node 2 from the comparison consideration. With node 2 eliminated, the one remaining mismatch or transition occurring between the registered status of token track counter 10607 binary counter states of nodes 3 and 4 identifies the network location wherein the token signal was lost.

Ring control 18, FIG. 1, having identified the network location of the lost token signal, formats a reconfiguration data message and transmits the formatted data message over data bus 17 through line interface unit 12 to node processor 11 of node 5. Node processor 11 controls node 5 to force write reconfiguration data messages addressed to network nodes 3 and 4 onto outgoing transmission paths 15 and 16. Upon receipt of the reconfiguration messages, nodes 3 and 4 function to couple incoming transmission paths 15 and 16, respectively, to outgoing transmission paths 16 and 15 thereby reconfiguring network 1 to isolate the identified fault section of network 1 between nodes 3 and 4 from the active section of network 1 now existing between nodes 4 and 3 through nodes 5, 6, 7 and 2.

Ring control 18 further transmits an initialization data message over data bus 17 to node 5 which is formatted and force written onto outgoing transmission paths 15 and 16. The formatted initialization data message sequentially enables each node, FIG. 2, of the active section of the network to force read data messages from network 1 and to clear token track counter 10607 via logic gate 10605, token track clear detector 10602 and header store 1050. Thus, ring control processor 18 clears the reconfigured network of all data messages and initializes each node token track counter 10607 located in the reconfigured network. Ring control 18 also enables node 5, FIG. 1, to write another token signal onto looped transmission paths 15, 16 and records the identity of token signal writing node 5 in memory unit 181, FIG. 3. The new token signal transmitted on transmission paths 15, 16, FIG. 1, of the active section of reconfigured network 1, sequentially enables each node to write data messages onto network 1. The isolated fault section of the reconfigured network may then be repaired and restored to active service.

In one embodiment of the invention, nodes and ring control 18 function together to identify a network location wherein a token signal is lost. In another embodiment of the invention, ring control 18 is arranged so that memory unit 181, FIG. 3, is configured to have binary counter states with ones of the binary counter states corresponding with ones of the nodes. A node processor 11 of a node, for example node 4, detecting the arrival of the token signal informs ring control 18 that the token signal has arrived at node 4. Ring control central processing unit 180, FIG. 3, which may be connected by data bus 183 to each node processor 11, records the arrival of the token signal in binary counter states corresponding to node 4 and initiates the start of a predetermined interval of time.

As the token signal is transmitted around network 1, each node binary counter states in ring control memory unit 181 records the node arrival of the token signal and central processing unit 180 initiates the start of a predetermined interval of time unique to the node. If the token signal is lost, for example between nodes 3 and 4, node 4 and succeeding network nodes 5, 6, 7, 2 and 3 fail to notify ring control 18. Each node predetermined interval of time expires thereby notifying central processing unit 180 that a network loss of the token signal has occurred. Central processing unit 180 responds thereto by comparing the memory unit 181 binary counter states corresponding with adjacent ones of the nodes in the manner herein earlier described to detect mismatches and transitions identifying the network location wherein the token signal was lost. After the network location is identified ring control 18 reconfigures network 1 to isolate the identified network location of the lost token signal and clears the reconfigured network of all data messages. Central processing unit 180 then controls memory unit 181 to initialize all of the node pairs of binary counter states and enables one of the network nodes 2, 5 to write another token signal onto one of the transmission paths 15, 16 of the reconfigured network.

In yet another embodiment of the invention, each or selected ones of the nodes are designated as a token control node and the associated node processor memory unit 111, FIG. 3, is configured to have pairs of binary counter states with each pair of binary counter states corresponding with a node. A node processor 11, FIG. 1, of a node detecting the arrival of the token signal informs node processor 11 having token control of the arrival of the token signal at the node. Central processing unit 110, FIG. 3, of token control node processor 11 which may be connected by data bus 113 to each node processor 11, records the token signal arrival in a pair of binary counter states corresponding to the token signal receiving node and initiates the start of a predetermined interval of time.

As a token signal is transmitted around network 1, each pair of node binary counter states in designated token control node processor memory unit 111 records the arrival of the token signal at a node and central processing unit 110 initiates the start of a predetermined interval of time unique to the node. If the token signal is lost, succeeding nodes fail to notify the token control node processor 11. Each node predetermined interval of time expires thereby notifying central processing unit 110 that a network loss of the token signal has occurred. Central processing unit 110 responds by comparing the memory unit 111 registered binary counter states corresponding with adjacent ones of the nodes in the manner herein earlier described to detect mismatches and transitions identifying the network location wherein the token signal was lost. After the network location is identified, the token control node processor 11 reconfigures the network to isolate the identified network location and clears the reconfigured network of all data messages. Central processing unit 110 controls memory unit 111 to initialize all of the node pairs of binary counter states and force writes another token signal onto one of the transmission paths of the reconfigured network.

Figure 6:
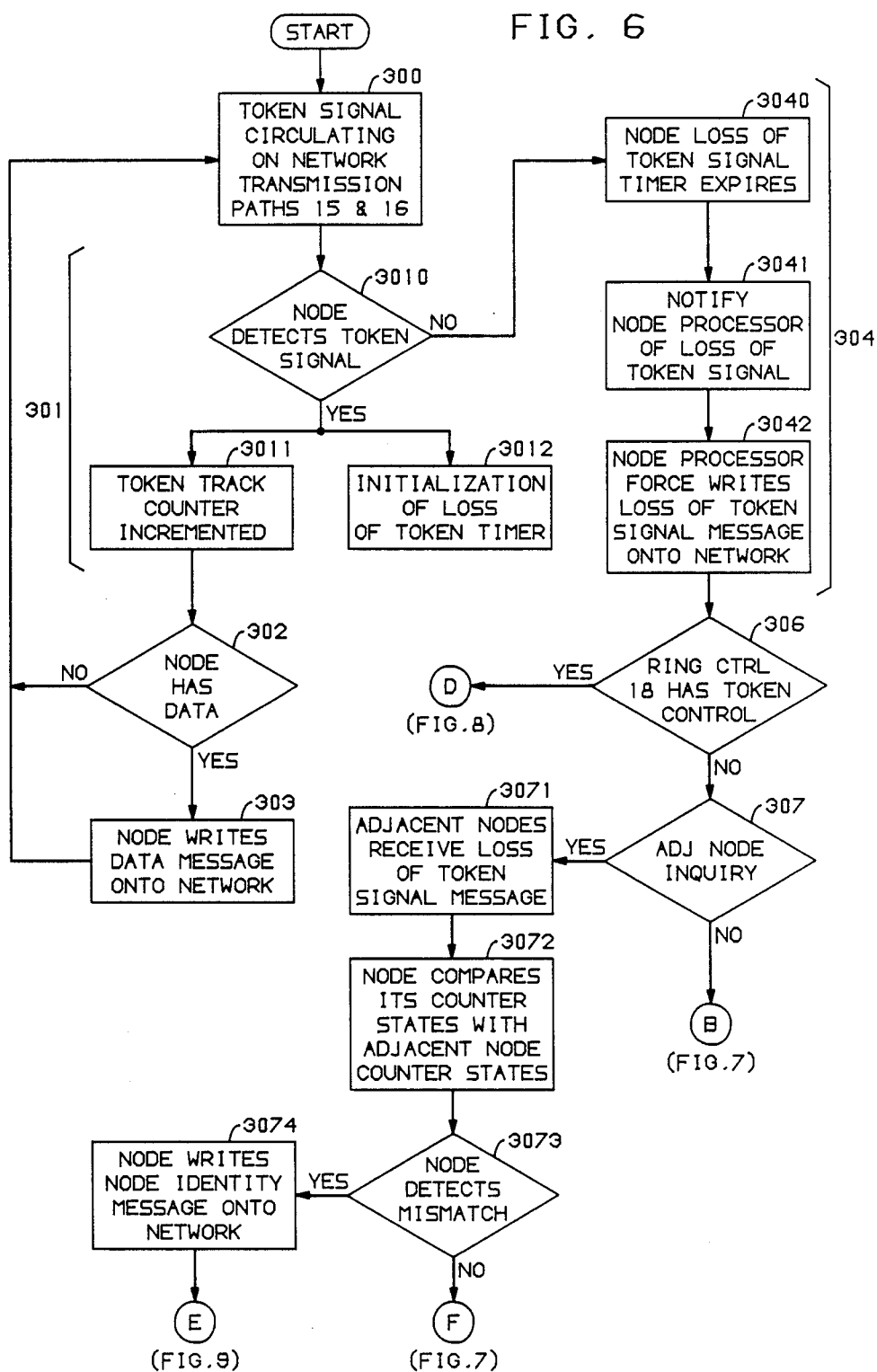
FIGS. 6 through 10 illustrate a flow chart of the operation of the network set forth in FIG. 1 in accordance with the principles of the invention.

In the operation of network 1, FIG. 6, a token signal, step 300, continuously circulates on transmission paths 15, 16 to sequentially enable each node to write data messages onto network 1. The method of locating a lost token signal comprises, step 301, detecting the arrival of the token signal at each node, step 3010, and recording the node detection of the token signal arrival in the node binary counter states, step 3011, by incrementing the node token track counter 10607 and initiating a predetermined interval of time, step 3012. If the node does not have a data message, step 302, the token signal continues circulating on network transmission paths 15, 16. When there is a data message at the node, step 303, the node writes the data message onto an outgoing transmission path 15, 16, and at the end thereof transmits the received token signal on the outgoing transmission path to the next node. If a node, step 304, fails to receive a token signal, the node loss of token timer 10608 expires, step 3040, and notifies node processor 11, step 3041, that a loss of token signal has occurred in network 1. Node processor 11, step 3042, force writes a loss of token signal data message identifying the current status of the node token track counter binary counter states and addressed to ring control 18, or adjacent nodes, onto a network transmission path 15, 16 or interconnecting data bus.

Figure 8:
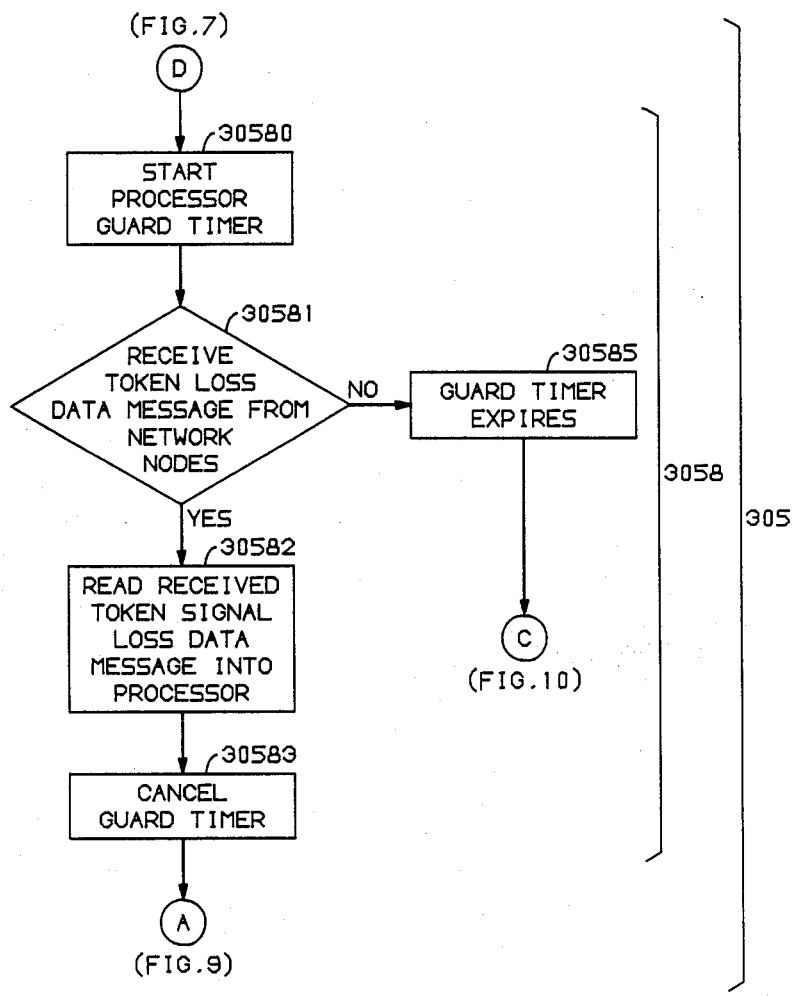

If ring control 18 has token control, step 306, central processing unit 180 starts a processor guard timer, FIG. 8, step 30580. Ring control 18, on receiving each node generated loss of token signal data message, step 30581, registers the current status of the node token track counter 10607 binary counter states set forth therein, step 30582, cancels the guard timer, step 30583, and enters a sequence, step 305, FIG. 9, of comparing the registered binary counter states status to detect mismatches and transitions identifying the network location wherein the token signal was lost.

Central processing unit 180, step 30590, compares the registered binary counter states status of each node with the registered binary counter states status of adjacent nodes to identify mismatches and transitions. If there are no transitions, step 30591, ring control 18 identifies the node used to first write the lost token signal onto network 1 as the fault location, step 30592. When there are multiple adjacent node mismatches and transitions, step 30591, ring control 18, step 30593, determines node locations wherein the transitions and mismatches occurred and eliminates the identity, step 30594, of the node having first wrote the token signal onto network 1. Ring control 18, identifying the network location, step 30595, wherein the token signal was lost from the remaining transitions occurring in compared ones of the registered node binary counter states, passes the failure location to the recovery process, step 30596.

Figure 10:
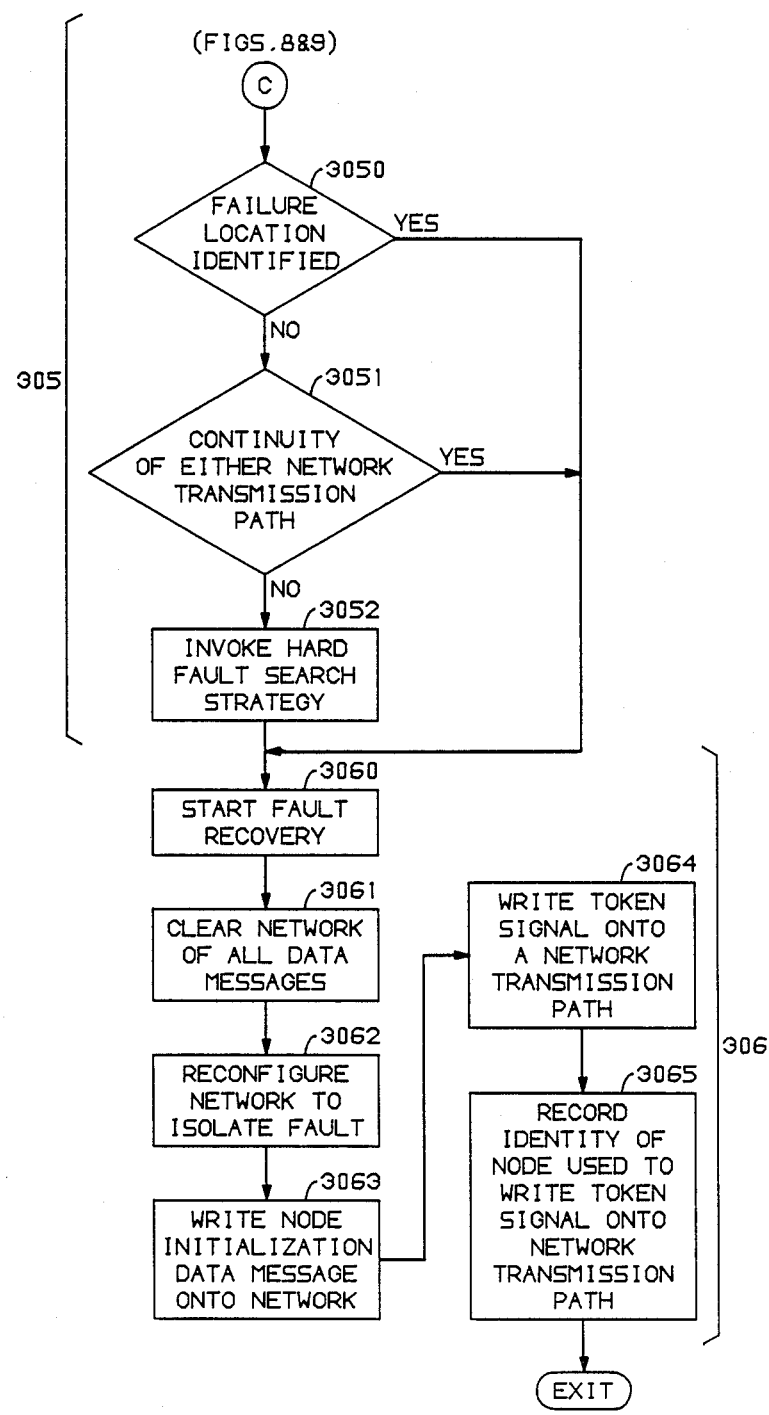

The recovery process, FIG. 10, checks to see if the failure location has been identified, step 3050, and if there is continuity of either network transmission path 15, 16, step 3051. Should it be determined that there is no continuity of either network transmission path 15, 16, ring control 18 invokes a hard fault search strategy, step 3052. Once a failure location has been identified, either by a hard fault search strategy or by analysis of node counter states, ring control 18 starts fault recovery, step 3060. A first step 3061 is to clear network 1 of all data messages by force reading the network data messages into nodes processor 11 and then reconfigure network 1, step 3062, to isolate the identified network location of the lost token signal. Assuming that the token signal was lost between nodes 3 and 4, FIG. 1, as determined from transitions occurring in the compared binary counter states of node 3 and 4 token track counters 10607, ring control 18 will force write a data message onto network 1 instructing nodes 3 and 4 to loop connect transmission paths 15 and 16 together.

The reconfigured network is arranged such that data messages incoming on transmission path 15 to node 3 from node 2 and intended for other nodes are transmitted from node 3 on outgoing transmission path 16 to node 2. Similarly, data messages incoming on transmission path 16 from node 5 to node 4 and intended for other network nodes are transmitted from node 4 on outgoing transmission path 15 to node 5. Thus, a data message written onto reconfigured network 1 and incoming to node 4, FIG. 4, on incoming transmission path 16 is force read through switch 2010 and read store 2030 into node processor 11. When the network token signal is detected by node 4 token control 2060, node processor 11 writes the data message over data bus 13 into write store 1040 and through switch 1020 onto outgoing transmission path 15.

Once network 1 has been reconfigured to isolate the fault section assumed to be between nodes 3 and 4, ring control 18, FIG. 10, initializes the node binary counter states by writing an initialization data message, step 3063, onto a network transmission path. The initialization data message is transmitted on network transmission paths 15, 16 to sequentially reach each node 2 through 7 where it enables token track clear detector 10602, FIG. 2, to clear each node token track counter 10607 by initializing the binary counter states thereof. Ring control 18 then writes another or new token signal, step 3064, onto one of the transmission paths 15, 16 of the reconfigured network and records the identity of the node, for example node 2, step 3065, having wrote the other or new token signal onto network 1 into memory unit 180. The new token signal is transmitted on the reconfigured network transmission paths 15, 16 to sequentially enable each node to write data messages onto reconfigured network 1. The isolated section may then be repaired and subsequently returned to service.

Figure 7:
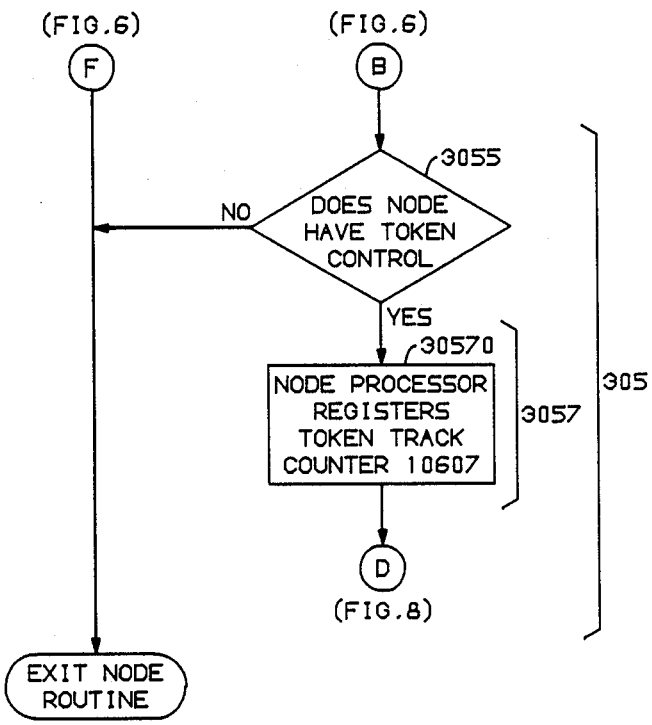

If a node is not arranged to query adjacent nodes, FIG. 6, step 307, and has token control, FIG. 7, step 3055, the expiration of the predetermined time interval results in loss of token timer 10608, FIG. 2, notifying node processor 11 that the token signal has been lost. Node processor 11 interrogates token track counter 10607 and registers the current status of the node binary counter states recorded therein, step 30570. In addition, node processor central processing unit 110, FIG. 3, starts a node processor guard timer, FIG. 8, step 30580. During the guard timer timing interval, node processor 11, step 30582, receives a loss of token signal data message from each node either over the network transmission paths 15, 16, or over a data bus interconnecting all node processors 11, and registers the received node binary counter states status in node processor memory unit 111, FIG. 3. When all of the node loss of token signal data messages have been received, node processor central processing unit 110 cancels the guard timer, step 30583.

Figure 9:
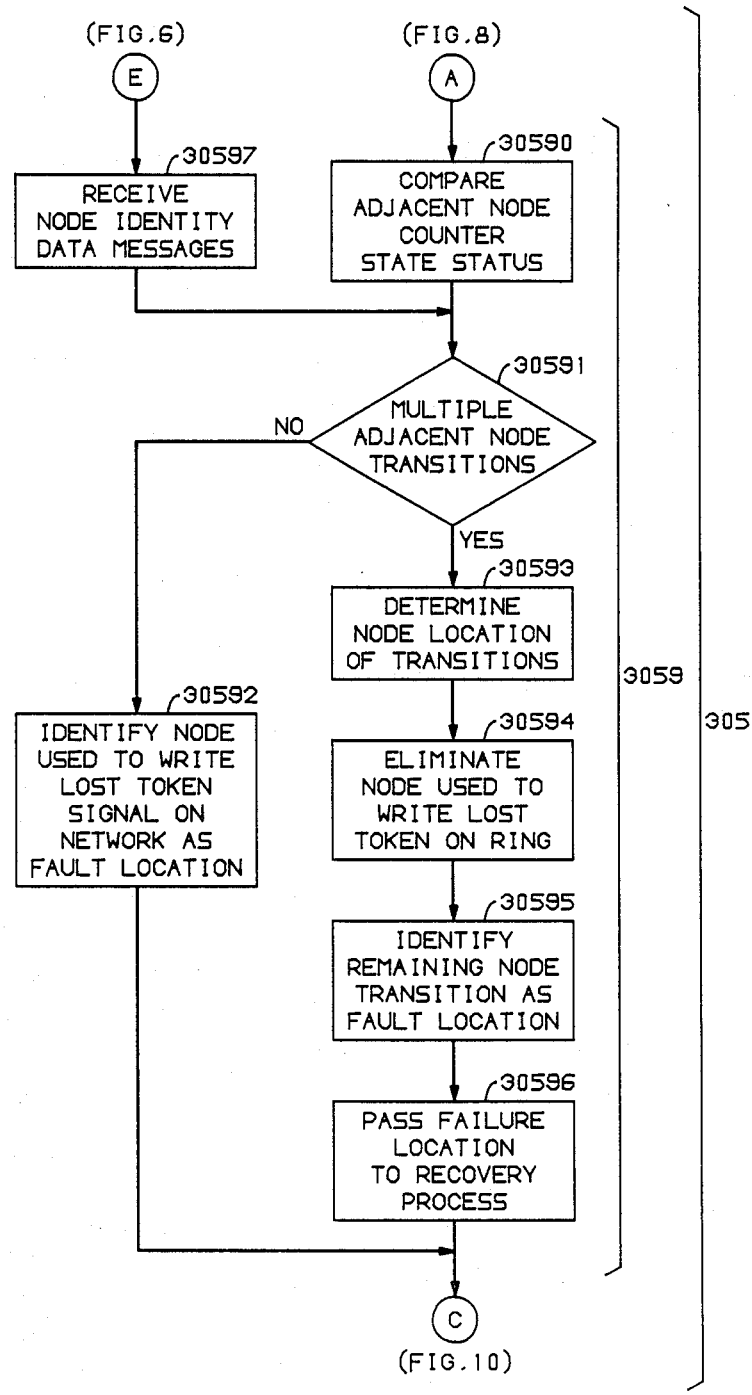

As set forth in FIG. 9, steps 30590 through 30596, a token control node identifies the network location wherein the token signal was lost from transitions and mismatches occurring between ones of adjacent node registered status of node binary counter states. Upon identifying the network location of the lost token signal, node processor 11 initiates a recovery sequence, FIG. 10, steps 3050 through 3052 and 3060 through 3065, to reconfigure network 1 to isolate the fault section and restore the reconfigured network 1 to active service by writing another token signal onto the reconfigured network 1 to replace the one that was lost.

If node processor 11 having token control does not receive token signal lost data messages, guard timer expires, FIG. 8, step 30585. Should the fault location be identified, FIG. 10, step 3050, node processor 11 enters the fault recovery routine, step 306, to reconfigure network 1 to isolate the network section wherein the token signal was lost and to write another token signal onto reconfigured network 1. If the fault location has not been identified, step 3050, node processor 11 determines the continuity of either network transmission path 15, 16 and if there is continuity of at least one transmission path, step 3051, enters fault routine, step 306. When continuity has been lost on both network transmission paths 15, 16, node processor invokes a hard fault search strategy, step 3052, to identify the fault location. After identifying the fault location, node processor 11 invokes fault recovery routine, step 306.

As earlier set forth, ring control 18 can identify the network location of a lost token signal. Each network node receiving the token signal generates a token signal data message that is addressed to ring control 18 and notifies ring control 18 via an interconnecting data bus of the arrival of the token signal at the network node. The method of operating ring control 18 comprises the step of detecting the arrival of the token signal at each node and recording the node detection of the token signal arrival in ring control memory unit 181 binary counter states corresponding to each network node. The ring control 18 method of operation further comprises the steps of initiating a predetermined interval of time upon recording each node token signal arrival and comparing, upon an expiration of the predetermined interval of time indicating a network loss of the token signal, the network location of the lost token signal from mismatches and transitions occurring between adjacent node recorded status of binary counter states. After identifying the network location of the lost token signal, ring control 18 initiates a fault recovery sequence, step 306, FIG. 10.

Figure 4:
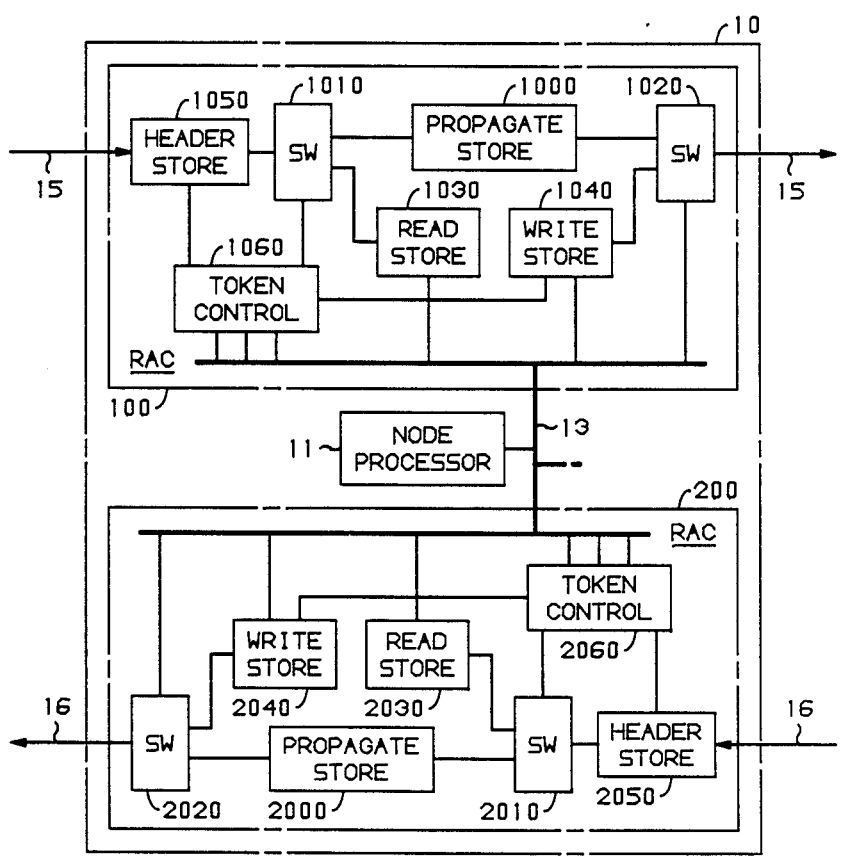
FIG. 4 illustrates the interrelationship of the node functional apparatus for a counter-rotating ring network of the type set forth in FIG. 1.

In yet another embodiment of the invention, each node 2 through 7, FIG. 1, detects and records the token signal arrival in counter states of the node token track counter 10607, FIG. 2. As earlier set forth, each node loss of token timer 10608, for example node 4, is initialized upon arrival of the token signal to start the predetermined internal of time. If the token signal does not return to node 4, the predetermined interval of time expires indicating a network loss of the token signal. Loss of token timer 10608 signals node 4 processor 11 that the token signal has been lost thereby enabling node processor 11 to register in memory unit 111 the status of the node 4 token track counter 10607 received over data bus 13. Node processor 11 queries adjacent nodes, FIG. 6, step 307, by formatting a loss of token signal data message denoting the registered status of the node counter states and addresses the loss of token signal data message to adjacent nodes. The formatted loss of token signal data message, FIG. 4, is force written, via data bus 13, a write store 1040, 2040 and switch 1020, 2020, onto an appropriate outgoing transmission path 15, 16. When loss of token signal data messages are received from adjacent nodes, such as nodes 3 and 5, and addressed to node 4, node 4 processor 11 reads the loss of token signal data messages, via the appropriate switch 1010, 2010, read store 1030, 2030 and data bus 13, FIG. 6, step 3071, and registers the received current status of adjacent nodes 3 and 5 counter states into memory unit 111.

Node 4 processor 11 central processing unit 110 subsequently compares the registered current status of node 4 counter states, step 3072, with the registered current status of node counter states received from adjacent nodes 3 and 5. Upon detecting transitions or mismatches of the node 4 counter states status when compared with the adjacent nodes 3 and 5 counter states status, step 3073, node 4 processor 11 formats a node identity data message, step 3074, signifying that node 4 has detected a transition or mismatch, FIG. 5, of the registered status of node 4 counter states with the received registered status of adjacent node 3 counter status. The formatted node 4 identify data message is transmitted from node 4 processor 11, FIG. 1, via write store 1040, and force written through switch 1020 onto transmission path 15 for transmission to ring control 18. Similarly, node 4 identify data message could, at the option of node 4 processor 11, have been transmitted to ring control 18, via transmission path 16. Nodes 2 and 3, FIG. 5, also having detected transitions in respect to registered status of counter states received from adjacent nodes 3 and 4, respectively, format node identify data messages that are transmitted to ring control 18. If a node does not detect mismatches or transitions, FIG. 6, step 3073, the node exits the node routine. Central processing unit 180, FIG. 3, of ring control 18 responds to receipt of the node identify data messages, FIG. 9, step 30597, by eliminating the identity of the node, assumed herein to be node 2, having originally wrote the lost token signal onto network 1. Ring control 18 identifies the network location wherein the token signal was lost from the remaining received node identity data messages such, for example, received node identities of nodes 3 and 4 thereby identifying the network segment between nodes 3 and 4 wherein the token signal was lost. Ring control 18 functions to clear network 1 of data messages by force reading the network data messages into node processors 11, reconfigures network 1 to isolate the network segment wherein the token signal was lost, initializes all node token track counters 10607 and enables a node such as nodes 2, 5 to write another token signal onto network 1.

What is claimed is:

1. A network having nodes interconnected by transmission paths wherein a token signal transmitted on the transmission paths sequentially enables each node to write data messages onto the network comprising means having a plurality of counter states corresponding with each node for recording an arrival of the token signal at the node as a change of said node counter states, and means associated with said recording means for comparing ones of said recording means counter states corresponding with adjacent nodes to detect mismatches occurring in said node counter states identifying a network location of a lost of the token signal.

2. The network of claim 1 wherein said recording means comprises means for detecting the arrival of the token signal at each node, and means coupled with said detecting means and having a pair of binary counter states corresponding with a node for recording the node detection of the token signal arrival in said pair of binary counter states.

3. The network of claim 2 wherein said recording means further comprises means enabled by said detecting means for initiating a start of a predetermined interval of time, and means enabled by said initiating means upon an expiration of said predetermined interval of time indicating the loss of the token signal for registering a current status of said node binary counter states.

4. The network of claim 3 wherein said comparing means comprises means for comparing said registered status of said node binary counter states corresponding to adjacent ones of the nodes, means for eliminating an identity of a node having first wrote the token signal onto the network transmission paths, and means for identifying the network location wherein the token signal was lost from mismatches occurring in ones of said compared status of said node binary counter states corresponding to adjacent nodes.

5. The network of claim 4 wherein said network comprises means enabled upon identifying network location wherein token signal was lost for reconfiguring the network to isolate the identified network location of the lost token signal, means enabled upon reconfiguring of the network for clearing the reconfigured network of all data messages and for initializing said binary counter states recording means, means enabled upon clearing the reconfigured network of data for writing another token signal onto one of the transmission paths of the reconfigured network, and means enabled upon writing said other token signal onto the reconfigured network for recording the identity of a node having first wrote said other token signal onto the network transmission paths.

6. A network having nodes interconnected by transmission paths wherein a token signal transmitted on the transmission paths sequentially enables each node to write data messages onto the network comprising means having binary counter states corresponding with each node for detecting an arrival of the token signal at each node and for recording the node detection of the token signal arrival in ones of said binary counter states, means enabled by said detecting and recording means upon detection of the token signal arrival at each node for initiating a start of a predetermined interval of time and upon an expiration of said time interval indicating a loss of token signal in the network for registering a current status of said detecting and recording means binary counter states, and means for comparing said registered status of said binary counter states of adjacent nodes and for identifying a network location wherein the token signal was lost from mismatches occurring in ones of said compared registered binary counter states status.

7. The network of claim 6 wherein said network further comprises means for reconfiguring the network to isolate the identified network location of the lost token signal, and means for writing another token signal onto the network transmission paths of the reconfigured network.

8. A network having nodes interconnected by transmission paths wherein a token signal transmitted on the transmission paths sequentially enables each node to write data messages onto the network comprising means for detecting an arrival of the token signal at each node, means coupled with said detecting means and having binary counter states corresponding with each node for recording a node detection of the token signal arrival in ones of said binary counter states, means enabled by said detecting means for initiating a start of a predetermined interval of time, means enabled by said time interval initiating means upon an expiration of said predetermined interval of time as indicating a loss of the token signal for registering a current status of said binary counter states, means for comparing said registered status of said binary counter states of adjacent ones of the nodes, means for eliminating an identity of a node having first wrote the token signal onto the network, means for identifying a network location wherein the token signal was lost from mismatches occurring in said compared ones of said registered status of said binary counter states, means for reconfiguring the network to isolate the identified network location of the lost token signal, means for clearing the reconfigured network of all data messages and for initializing said binary counter states recording means, means for writing another token signal onto the reconfigured network, and means for recording the identity of a node having first wrote said other token signal onto the reconfigured network.

9. A network having a ring control processor coupled with nodes interconnected by transmission paths wherein a token signal transmitted on the transmission paths sequentially enables a processor of each node to write data messages onto the network comprising means located at each node and having counter states for recording an arrival of the token signal at the node, and means located at the ring control processor for receiving a status of said node counter states and comparing said received status of said node counter states of adjacent ones of the nodes to detect mismatches identifying a network location of a loss of the token signal.

10. The network of claim 9 wherein said node recording means comprises means for detecting the token signal arrival at each node, and means coupled with said detecting means and having binary counter states for recording the node detection of the token signal arrival in said binary counter states.

11. The network of claim 10 wherein said node recording means further comprises means enabled by said detecting means upon detection of the token signal arrival for initiating a start of a predetermined interval of time, means enabled by said time interval initiating means upon an expiration of said predetermined interval of time as indicating the loss of the token signal for registering a current status of said node binary counter states in said node processor, and means for transmitting said registered binary counter states status to said ring control processor.

12. The network of claim 11 wherein said ring control processor receiving and comparing means comprises means for receiving said transmitted registered node binary counter states status, means for comparing said received node binary counter states status of adjacent ones of the nodes, means for eliminating an identity of a node having first wrote the lost token signal onto the network transmission paths, and means for identifying the network location wherein the token signal was lost from mismatches occurring in ones of said registered node binary counter states status received from adjacent nodes.

13. The network of claim 12 wherein said ring control processor comprises means for reconfiguring the network to isolate the identified network location of the lost token signal, means for clearing the reconfigured network of all data messages and for initializing said node binary counter states recording means, means for writing another token signal onto one of the network transmission paths, and means for recording the identity of a node having first wrote said other token signal onto the network transmission path.

14. A network having a ring control processor coupled with nodes interconnected by transmission paths wherein a token signal transmitted on the transmission paths sequentially enables a processor of each node to write data messages onto the network comprising node detecting and recording means having binary counter states for detecting an arrival of the token signal at the node and for recording the node detection of the token signal arrival in ones of said binary counter states, node timing means enabled by said detecting and recording means upon detection of the token signal arrival at the node for initiating a start of a predetermined interval of time and upon an expiration of said time interval indicating a loss of the token signal for registering a current status of said binary counter states, and ring control processor means for comparing said registered status of adjacent nodes binary counter states and for identifying a network location wherein the token signal was lost from mismatches occurring in ones of said compared adjacent node registered binary counter states status.

15. A network having a network control processor coupled with nodes interconnected by transmission paths wherein a token signal transmitted on the transmission paths sequentially enables a processor of each node to write data onto the network comprising node detecting means for detecting an arrival of the token signal at the node, node counting means coupled with said node detecting means and having binary counter states for recording the node detection of the arrival of the token signal in said binary counter states, node timing means enabled by said node detecting means for initiating a start of a predetermined interval of time upon the detection of the token signal arrival at the node, node processor registering means enabled by said node timing means upon an expiration of said predetermined interval of time as indicating a lost of the token signal for registering a current status of said node binary counter states, node transmitting means for transmitting said registered status of said node binary counter states to the ring control processor, ring control processor receiving means for receiving said transmitted registered status of said node binary counter states, ring control processor comparing means for comparing said received registered status of said node binary counter states of adjacent ones of the nodes, ring control processor node identity eliminating means for eliminating an identity of a node having first wrote the lost token signal onto the network transmission paths, ring control processor identifying means for identifying the network location wherein the token signal was lost from mismatches occurring in ones of said compared registered status of said node binary counter states, ring control processor network reconfiguring means for reconfiguring the network to isolate the identified network location of the lost token signal, ring control processor data message clearing means for clearing the reconfigured network of all data messages and for initializing said node counting means for each node in the reconfigured network.

ring control processor write enabling means for enabling a node to write another token signal onto the reconfigured network, and ring control processor node identity recording means for recording the identity of the node having first wrote said other token signal onto the reconfigured network.

16. A token control node for use with a network having nodes interconnected by transmission paths wherein a token signal transmitted on the transmission paths sequentially enables each node to write data messages onto the network wherein said token control node comprises means having counter states for detecting an arrival of the token signal at the node and for recording the node detection of the token signal arrival in ones of said counter states, means enabled by said detecting and recording means upon detection of the token signal at the node for initiating a start of a predetermined interval of time and upon an expiration of said time interval indicating a network loss of the token signal for registering a current status of said detecting and recording means counter states, and means for receiving and comparing a registered status of adjacent node counter states with said node registered counter states status and for identifying a network location wherein the token signal was lost from mismatches occurring between compared ones of said registered status of said node counter states.

17. A ring control processor coupled with nodes interconnected by transmission paths to form a network wherein a token signal transmitted on the transmission paths sequentially enables each node to write data messages onto the network wherein said ring control processor comprises means having counter states corresponding with each of the nodes for recording an arrival of the token signal at each node as a change of said node counter states, and means for comparing counter states corresponding with adjacent ones of the nodes to detect mismatches occurring in said node counter states identifying a network location wherein the token signal was lost.

18. The ring control processor of claim 17 comprising means for reconfiguring the network to isolate the identified network location of the lost token signal, means for clearing the reconfigured network of all data messages and for initializing said node counter states, and means for writing another token signal onto one of the network transmission paths of the reconfigured network.

19. A method of identifying a location of a token signal lost in a network having nodes interconnected by transmission paths wherein the token signal is transmitted on the transmission paths to sequentially enable each node to write data messages onto the network comprising the steps of recording an arrival of the token signal at each node in counter states corresponding to the node, and comparing said node counter states recorded in adjacent ones of the nodes to detect mismatches of said recorded counter states identifying a network location wherein the token signal was lost.

20. The method of identifying the network location of a lost token signal as set forth in claim 19 wherein said recording step comprises the steps of detecting the arrival of the token signal at each node, and recording the node detection of the token signal arrival in counter states corresponding with each node.

21. The method of identifying the network location of a lost token as set forth in claim 20 wherein said recording step further comprises the steps of
    initiating a start of a predetermined interval of time in response to detecting said node token signal arrival, and
    registering a current status of said node counter states upon an expiration of said predetermined interval of time.

22. The method of identifying the network location of a lost token signal as set forth in claim 21 wherein said comparing step comprises the steps of
    comparing said registered node counter states status of adjacent ones of the nodes,
    eliminating the identity of a node having first wrote the lost token signal onto the network and
    identifying the network location wherein the token signal was lost from mismatches occurring in ones of said compared register node counter states status.

23. The method of identifying the network location of a lost token signal as set forth in claim 22 wherein said method further comprises the steps of
    reconfiguring the network to isolate the identified network location of the lost token signal,
    clearing the reconfigured network of all data messages and initializing said node counter states,
    writing another token signal onto one of the reconfigured network transmission paths, and
    recording an identity of a node enabled to first write said other token signal onto the network transmission path.

24. A method of identifying a location of a token signal lost in a network having nodes interconnected by transmission paths wherein a token signal transmitted on the transmission paths sequentially enables each node to write data messages onto the network comprising the steps of
    detecting an arrival of the token signal at each node and recording the node detection of the token signal arrival in binary counter states,
    initiating a start of a predetermined interval of time upon the node detection of the token signal and upon an expiration of said time interval indicating a network los of the token signal registering a current status of said binary counter states, and
    comparing said registered binary counter states status of adjacent nodes and identifying a network location wherein the token signal was lost from mismatches occurring in ones of said compared adjacent node registered binary counter states status.

25. The method of identifying the network location of a lost token signal as set forth in claim 24 wherein said method further comprises the steps of
    reconfiguring the network to isolate the identified network location of the lost token signal, and
    writing another token signal onto one of the network transmission paths of the reconfigured network.

26. A method of identifying a location of a token signal lost in a network having nodes interconnected by transmission paths wherein a token signal transmitted on the transmission paths sequentially enables each node to write data messages onto the network comprising the steps of
    detecting an arrival of the token signal at each node,
    recording the node detection of the token signal arrival in one of pairs of binary counter states with each pair corresponding with a node,
    initiating a start of a predetermined interval of time upon the node detection of the token signal arrival,
    registering a current status of said pair of node binary counter states upon an expiration of said predetermined interval of time as indicating a network lost of the token signal,
    comparing said registered node binary counter state status of adjacent ones of the nodes,
    eliminating an identity of a node having first wrote the token signal onto the transmission paths,
    identifying the network location wherein the token signal was lost from mismatches occurring in said compared ones of said registered node binary counter states status,
    reconfiguring the network to isolate the identified network location of the lost token signal,
    clearing the reconfigured network of all data messages and initializing said pairs of node binary counters,
    writing another token signal onto one of the transmission paths of the reconfigured network, and
    recording the identity of a node having wrote said other token signal onto the reconfigured network transmission path.

27. A method of identifying a location of a token signal lost in a network having a ring control processor coupled with nodes interconnected by transmission paths wherein a token signal continuously transmitted on the transmission paths sequentially enables a processor of each node to write data messages onto the network comprising the steps of
    recording an arrival of the token signal at each node in counter states located at the node, and
    receiving a status of said node counter states at the ring processor upon a failure of the nodes to record the token signal arrival and comparing each received node counter states status with received node counter states status of adjacent ones of the nodes to detect mismatches therein identifying a network location wherein the token signal was lost.

28. A method of identifying a network location of a lost token signal by a token control node arranged for use with a network having nodes interconnected by transmission paths wherein the token signal continuously transmitted on the transmission paths sequentially enables each node to write data messages onto the network comprising the steps of
    detecting an arrival of the token signal at the node and recording the node detection of the token signal arrival in node counter states,
    initiating a start of a predetermined interval of time upon detecting said token signal and registering upon an expiration of said time interval indicating a loss of the token signal a current status of the node counter states,
    transmitting a data message of the node recorded counter states status to the token control node,
    receiving said transmitted data message at the token control node and registering said node recorded counter states status, and
    comparing said registered node counter states status and identifying a network location wherein the token signal was lost from mismatches occurring between ones of adjacent node registered counter states status.

29. A method of identifying a network location of a lost token signal by a ring control processor coupled with nodes interconnected by transmission paths to form a network wherein a token signal continuously transmitted on the transmission paths sequentially enables each node to write data messages onto the network comprising the steps of detecting an arrival of the token signal at each node and recording the node detection of the token signal arrival in ring control processor counter states corresponding to each node, initiating a start of a predetermined interval of time upon the recording of each node token signal arrival, and comparing upon an expiration of said predetermined time interval indicating a network loss of the token signal each recorded node counter states with recorded node counter states of adjacent nodes and identifying a network location wherein the token signal was lost from mismatches occurring therebetween.

30. The method of identifying the network location of a lost token signal as set forth in claim 29 wherein said method also comprises the steps of reconfiguring the network by the ring control processor to isolate the identified network location of the lost token signal, clearing the reconfigured network of all data messages and initializing said ring control processor node counter states, and writing another token signal onto the reconfigured network.

31. The method of identifying the network location of a lost token signal as set forth in claim 30 wherein said comparing step further comprises the steps of recording an identity of a node first writing said token signal onto the network, and eliminating the identity of the node having first wrote the lost token signal onto the network from said comparison of said recorded adjacent node counter states.

32. A network having a ring control processor coupled with nodes interconnected by transmission paths wherein a token signal transmitted on the transmission paths sequentially enables a processor of each node to write data onto the network comprising means located at each node and having counter states for detecting and recording an arrival of the token signal at the node, means enabled by said detecting and recording means upon detecting the token signal arrival for initiating a start of a predetermined interval of time, means enabled by expiration of said predetermined time interval indicating a loss of the token signal for registering in each node processor a current status of said node and adjacent nodes counter states in said node processor, means for comparing said node and adjacent node registered counter states status in said node processor to detect mismatches thereof, means enabled upon detection of said mismatches for transmitting an identity of said node and adjacent nodes to the ring control processor, means at the ring control processor for eliminating identities of nodes having first wrote the lost token signal onto the network transmission paths from said received node identities, and means for identifying a network location wherein the token signal was lost from the remaining received node and adjacent node identities.

33. The network of claim 32 further comprising means responsive to a failure of all nodes to detect mismatches of each node registered counter states status with compared adjacent node registered counter states status for identifying the network location of the lost token signal as being associated with the node having first wrote the lost token signal onto the network transmission paths.

34. A method of identifying a location of a token signal lost in a network having a ring control processor coupled with nodes interconnected by transmission paths wherein the token signal is transmitted on the transmission paths to sequentially enable a processor of each node to write data onto the network comprising the steps of detecting and recording an arrival of the token signal at the node in counter states, initiating a start of a predetermined interval of time upon detecting and recording the arrival of the token signal at the node, registering in each node processor a current status of both said node and adjacent node counter states in said node processor upon expiration of said predetermined time interval indicating a lost of the token signal, comparing said node and adjacent node registered counter states status in said node processor to detect mismatches thereof, transmitting upon detection of said mismatches an identity of said node and adjacent node to said ring control processor, eliminating an identity of a node having first wrote the lost token signal onto the network transmission paths from said received node identities, and identifying a network location wherein the token signal was lost from the remaining received node and adjacent node identities.

\* \* \* \* \*